UNITED STATES PATENT OFFICE.

NATHANIEL C. MITCHELL, OF PHILADELPHIA, PENNSYLVANIA.

PRODUCTION OF RESTORED OR DEVULCANIZED RUBBER.

SPECIFICATION forming part of Letters Patent No. 423,071, dated March 11, 1890.

Application filed December 3, 1889. Serial No. 332,455. (No model.)

*To all whom it may concern:*

Be it known that I, NATHANIEL C. MITCHELL, of Philadelphia, in the county of Philadelphia and State of Pennsylvania, have invented a new and useful Improvement in the Production of Restored or Devulcanized Rubber, which improvement is fully set forth in the following specification.

This invention has reference to the treatment of devulcanized rubber obtained from waste rubber goods, and its object is the production of a very superior quality of rubber in the form of powder, susceptible, by reason of its purity, elasticity, and other properties, of use in the manufacture of high-grade rubber goods.

In the ordinary process of restoring or reclaiming old rubber the stock, after devulcanization, is disintegrated by the action of cracker-rolls, and then spread out to dry, the drying being expedited by drawing heated air through the mass. This operation of drying is slow and costly and the driers occupy much space in the factory. The rubber, when dry, is in a lumpy condition. It is prepared for market by sheeting between rollers. Rubber treated in this manner cannot be pulverized, its constitution being such that when passed between rollers the particles adhere together and the mass immediately takes the form of a sheet.

I have discovered that if the rubber stock, after devulcanization, (in which live steam under pressure is employed,) be passed between rolls while moist, a very remarkable effect upon the appearance and properties of the rubber is produced, and I have in my application for patent, Serial No. 325,193, filed September 26, 1889, described and claimed this process of moist-rolling, which not only produces a high grade of rubber, but also saves the delay and cost of drying and the space occupied by the drying apparatus. The invention as described in said application is preferably carried out by continuing the rolling until the mass is perfectly dry and has formed a sheet of uniform texture, which is, in important respects, different from the ordinary product.

In order to produce a dry rubber powder, which for some purposes is in great demand, I proceed, as described in said application, by passing the rubber stock, while moist, between smooth-surfaced rolls—that is to say, beginning the rolling operation directly after removal of the stock from the devulcanizer. The first effect of such rolling is to reduce the rubber to a powdery condition, (which, as stated, cannot be effected if the rubber be dried,) after which the particles begin to adhere and form filaments. I now arrest the rolling while the rubber stock is in this pulverulent condition. This moist stock, if dried in the ordinary way, would become set and lose its pulverulent form. It is therefore necessary, in order to preserve this condition, to dry the rubber while keeping it constantly agitated or stirred up, so that the particles do not remain in one position long enough to admit of their adhering together. Many different means may be employed to keep the rubber in motion while drying so as to prevent adhesion of the particles into lumps, and it is not necessary to described any apparatus for this purpose. By way of example, however, it may be stated that the desired effect may be advantageously produced by means of an ordinary screw conveyer, which carries the stock slowly from one end to the other of a long tube heated by a surrounded steam-jacket, or by other convenient means. To expedite the process, heated air should be drawn or forced through the mass to carry off the moisture.

The product of this process is a new commodity, being devulcanized rubber in the form of a coarse powder, of great purity, unassociated with foreign matters. There is no such article on the market as a devulcanized-rubber powder. Unvulcanized or crude rubber does not exist in the form of powder, and, so far as I am aware, could not be reduced to that condition even if it were an object to do so, whereas ordinary restored and devulcanized rubber, as already explained, is necessarily produced in the form either of sheets or lumps.

The only rubber product that exists as a powder is a preparation known as "clear black," which is used as an adulterant or filler in the manufacture of cheap rubber goods. This preparation is made by grinding old rubber boots and other articles until very finely divided, and then by an air-blast blowing off as much of the dust and fiber as can be removed in that way. Much fiber and other foreign matters necessarily remain attached to or associated with the rubber particles, giving the mass a grayish-black color, whereas the product of my process is deep black in color and free from foreign matters.

What further and most clearly distinguishes my product from the powder above described is that the rubber contained in the latter is vulcanized. The devulcanized-rubber powder prepared according to the process herein described can be usefully employed for many purposes in the manufacture of rubber goods for which the so-called "clear black" could not be used.

Having now fully described my said invention, what I claim is—

1. The herein-described process of treating restored or devulcanized rubber, the said process consisting in passing the stock while moist between rollers until reduced to a pulverulent condition, and then drying the powder and at the same time agitating or stirring it to prevent adhesion of the separate particles, substantially as described.

2. The herein-described process of treating rubber reclaimed from waste rubber goods, said process consisting in devulcanizing the rubber by the action of live steam, then while the rubber is yet moist rolling it until reduced to a powder, and finally drying the powder and at the same time agitating or keeping it in motion to preserve the powdery condition, substantially as described.

3. As an article of manufacture, the restored rubber herein described, the same being a coarse-grained powder in a devulcanized and desulphurized state of a deep black color and free from impurities, such as fiber and the like.

In testimony whereof I have signed this specification in the presence of two subscribing witnesses.

NATHANIEL C. MITCHELL.

Witnesses:
J. M. STOTSBURY,
JOEL H. LEEDS.